April 7, 1931.  F. X. LAUTERBUR ET AL  1,799,520
DOUGH MIXING MACHINERY
Filed June 13, 1930  2 Sheets-Sheet 1
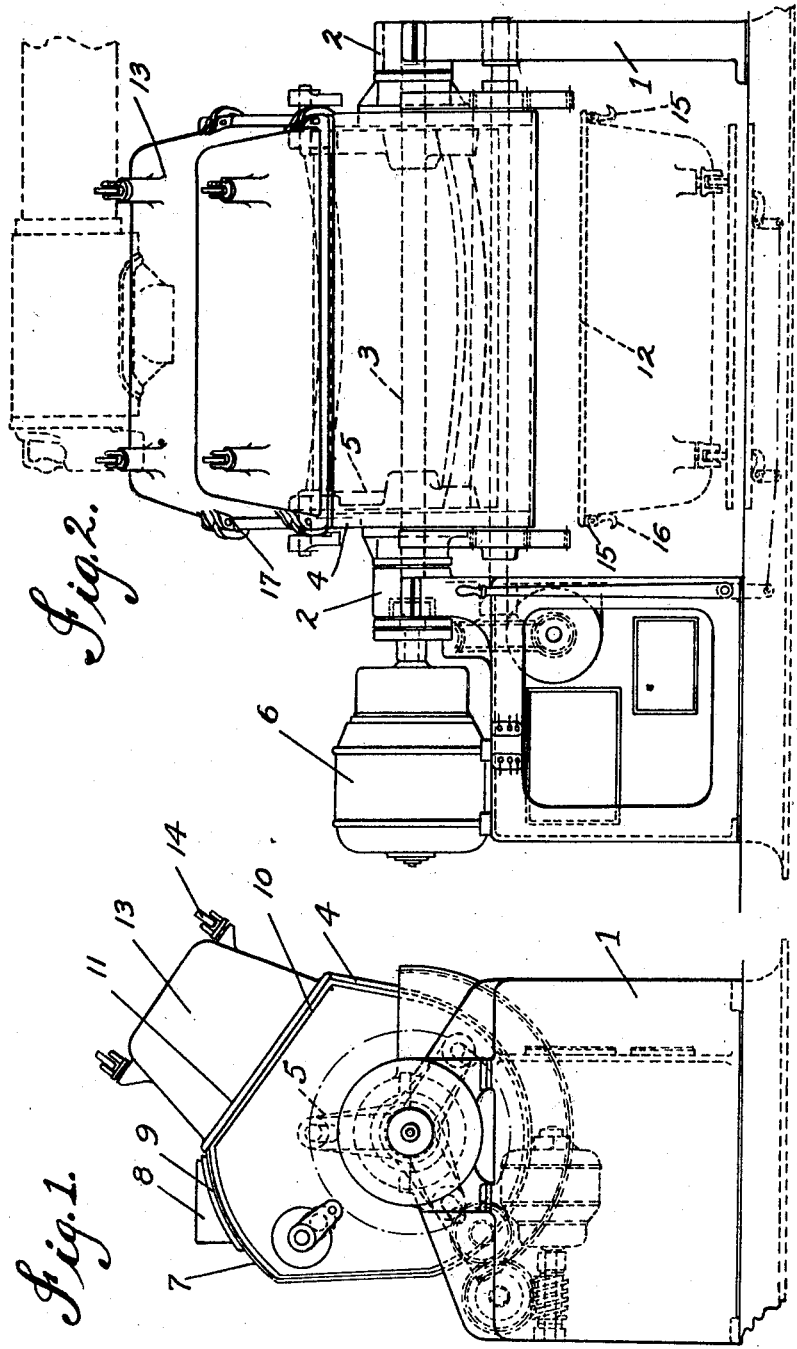
INVENTOR.
Frank X Lauterbur
Edward J Lauterbur
BY
ATTORNEYS

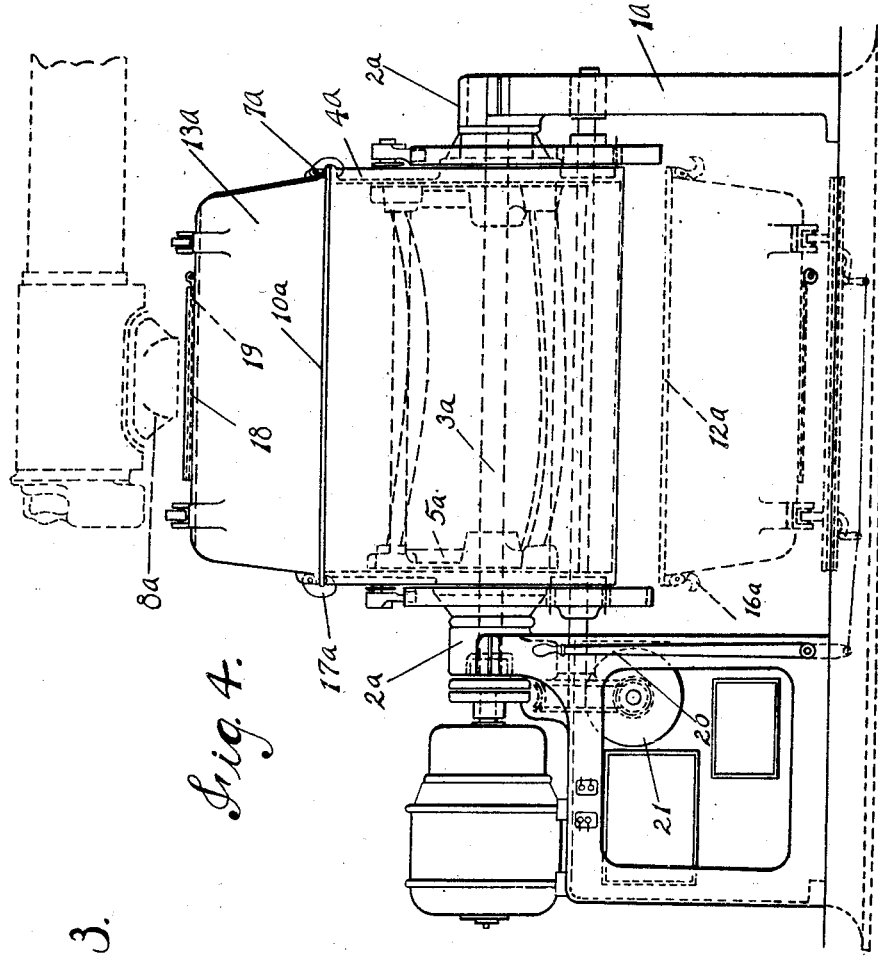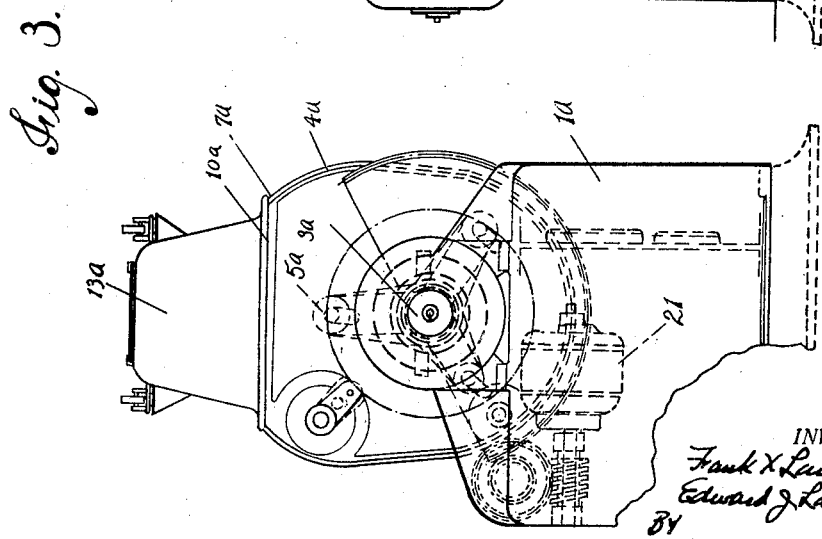

Patented Apr. 7, 1931

1,799,520

UNITED STATES PATENT OFFICE

FRANK X. LAUTERBUR AND EDWARD J. LAUTERBUR, OF SIDNEY, OHIO

DOUGH-MIXING MACHINERY

Application filed June 13, 1930. Serial No. 461,014.

Our invention relates to dough mixing machinery.

In the manufacture of certain types of dough for particular kinds of pastry or cake, it has been customary to mix the dough within a mixer and after a certain treatment to discharge the contents of the mixer into a trough or other receptacle in which ingredients are given some further treatment prior to being returned into the mixing machine.

The troughs which were originally used for receiving the contents of the mixer for the intermediate treatment or for the addition of other ingredients, is ordinarily provided with wheels or casters so that it may be moved about the floor of the mixing room as desired.

To the best of our knowledge and belief when doughs and floured batches are handled with this intermediate treatment the contents of the troughs has had to be put back into the mixer for further treatment. This has necessitated considerable hand labor in passing the material from the trough back into the mixer. It has taken considerable time to accomplish this and often the quality of the batch is harmed during its handling. It is the object of our invention to provide an auxiliary trough for attachment to a dough mixer casing which may be mechanically elevated so as to discharge the contents in a mass directly into the mixer.

Another object of our invention is the provision of an auxiliary trough which may be so atatched to the mixer bowl that it forms a part of the cover thereof, so that when the bowl is tilted to discharge the contents the mixed ingredients will discharge directly into the trough.

It is further the object of our invention to provide an auxiliary trough having wheels or casters to move the same about the floor of the mixing room, which will have a demountable connection with the mixer bowl so it may readily be disconnected after the contents of the mixer has been discharged into it.

A further object of our invention is the provision of mechanical means for rocking the mixer bowl or casing and at the same time elevating the storage trough into position to discharge into the mixer.

The above objects and other objects to which reference will be made in the ensuing disclosure we accomplish by that certain combination and arrangement of parts of which we have illustrated several preferred modifications.

Referring to the drawings:

Figure 1 is an end elevation of a dough mixer in which a detachable trough forming part of the cover may be elevated to an inclined position over the mixing bowl so that it will not interfere with a conduit through which different ingredients to be mixed are discharged into the mixer.

Figure 2 is a side elevation of the combination shown in Figure 1.

Figure 3 is an end elevation of a mixing bowl having a storage trough associated therewith, which may be mechanically moved to a position directly above the bowl, and in which the trough has an opening in its bottom through which ingredients may be discharged from a conduit into a mixer.

Figure 4 is a side elevation of the combination illustrated in Figure 3.

Referring first to Figures 1 and 2, we have indicated a supporting frame 1 having journal blocks 2 which journal a shaft 3 of a mixing bowl indicated at 4. The agitator 5 of the mixer is rotated by means of an electric motor indicated at 6.

The bowl cover 7 is preferably of contoured shape so that it will swing out from under the conduit 8, having a contoured flange 9 which fits snugly against the upper surface of the cover.

The cover has a flattened area 10 preferably having a channel 11 which engages the top edge 12 of a storage tank or trough 13. The trough illustrated has casters 14 so that it may be drawn about the floor of the mixing room as desired.

As means for demountably securing the storage trough to the flattened portion of the bowl cover we have shown bosses 15 having hood shaped clamps 16 which engage lugs 17 formed on the under edge of the flange of the trough. The trough indicated in dotted lines in Figure 2 shows the hook shaped clamps 16 disengaged, while the trough shown in connected position has the hook shaped clamps engaged to the bosses of the trough.

Since many bakers have more than one mixer and since they require different treatments for the dough batches mixed it is within the scope of our invention to provide a series of troughs, all of similar construction, so that each dough mixer will have more than one trough which can be used in connection with it.

In the modification shown in Figures 3 and 4 we have shown the same general structure and combination of parts as are illustrated in the combination shown in Figures 1 and 2. We have provided frame supporting members 1a with journal blocks 2a journaling the shaft 3a of the agitator 5a which rotates within the mixing bowl 4a. The top cover 7a of the bowl has a horizontally flat opening 10a which receives the upper flange 12a of the trough 13a. The trough in the modification shown in Figures 3 and 4 has a removable plate 18 which covers the opening 19 in the bottom of the trough, so that when the clamps 16a are secured to the bosses 17a of the bowl and the lever 20 which controls the motor 21 which actuates the rocking of the bowl, and the bowl is moved, to the position indicated in Figures 3 and 4, the cover plate 18 may be opened up and the ingredients to be mixed may be discharged through the trough into the mixer through the opening.

We have only illustrated two preferred modifications in which demountable troughs are associated with mixing bowls and provided with suitable connections so that the troughs can be elevated with the bowls into suitable positions to discharge into the mixers, but various mechanical modifications will occur to others for accomplishing this same purpose without departing from the spirit of our invention.

Having thus described our invention, what we claim is new and desire to secure by Letters Patent is:

1. In combination with a mixing machine having a bowl provided with means for rocking said bowl to discharge the contents thereof, a receiving trough provided with means for its attachment to said bowl to be moved therewith from receiving to discharging position of said trough.

2. In combination with a mixing machine having a bowl provided with means for rocking said bowl to discharge the contents thereof, a receiving trough provided with means for its attachment to said bowl to be moved therewith from receiving to discharging position of said trough, said bowl having a cover having an opening therein of similar size as the opening in said trough.

3. In combination with a mixing machine having a bowl provided with means for rocking said bowl to discharge the contents thereof, a receiving trough provided with means for its attachment to said bowl to be moved therewith from receiving to discharging position of said trough, said bowl being provided with means for receiving ingredients independent of said trough and irrespective of the position of said trough.

4. In combination with a mechanical mixing machine having a bowl movable from operating to discharging position, a demountable receiving tank provided with means for attaching said tank to said movable bowl.

5. In combination with a mechanical mixing machine having a bowl movable from operating to discharging position, a demountable receiving tank provided with means for attaching said tank to said movable bowl, said tank movable with said bowl from discharging to operating position of said bowl.

6. In combination with a mechanical mixing machine having a bowl movable from operating to discharging position, a demountable receiving tank provided with means for attaching said tank to said movable bowl, said tank movable with said bowl from discharging to operating position of said bowl, and means for supplying ingredients for mixing in said bowl when said trough is in operating position of said bowl.

7. In combination with a mixing machine having a tank provided with means for demountably securing same to said machine, a closure member in the bottom of said tank providing means for introducing ingredients into said mixing machine.

FRANK X. LAUTERBUR.
EDWARD J. LAUTERBUR.